Sept. 7, 1943.  H. HOLLMANN ET AL  2,328,804
TRACTOR DRIVING AND STEERING MECHANISM
Filed June 21, 1941   2 Sheets-Sheet 1
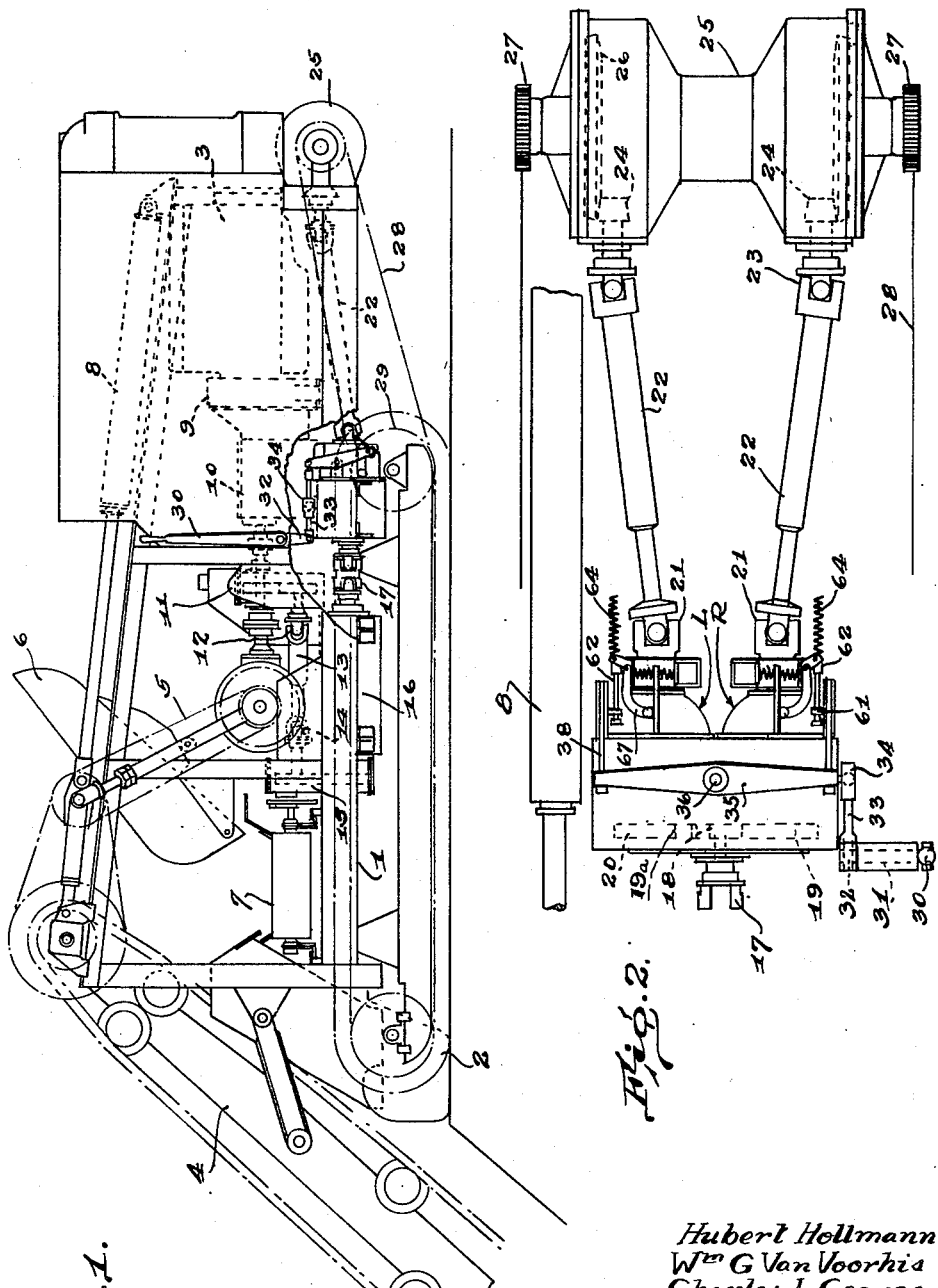
Hubert Hollmann
Wm G Van Voorhis
Charles L. George
Ralph O. Gerdeman
INVENTORS
BY  Malcolm W. Fraser
ATTORNEY

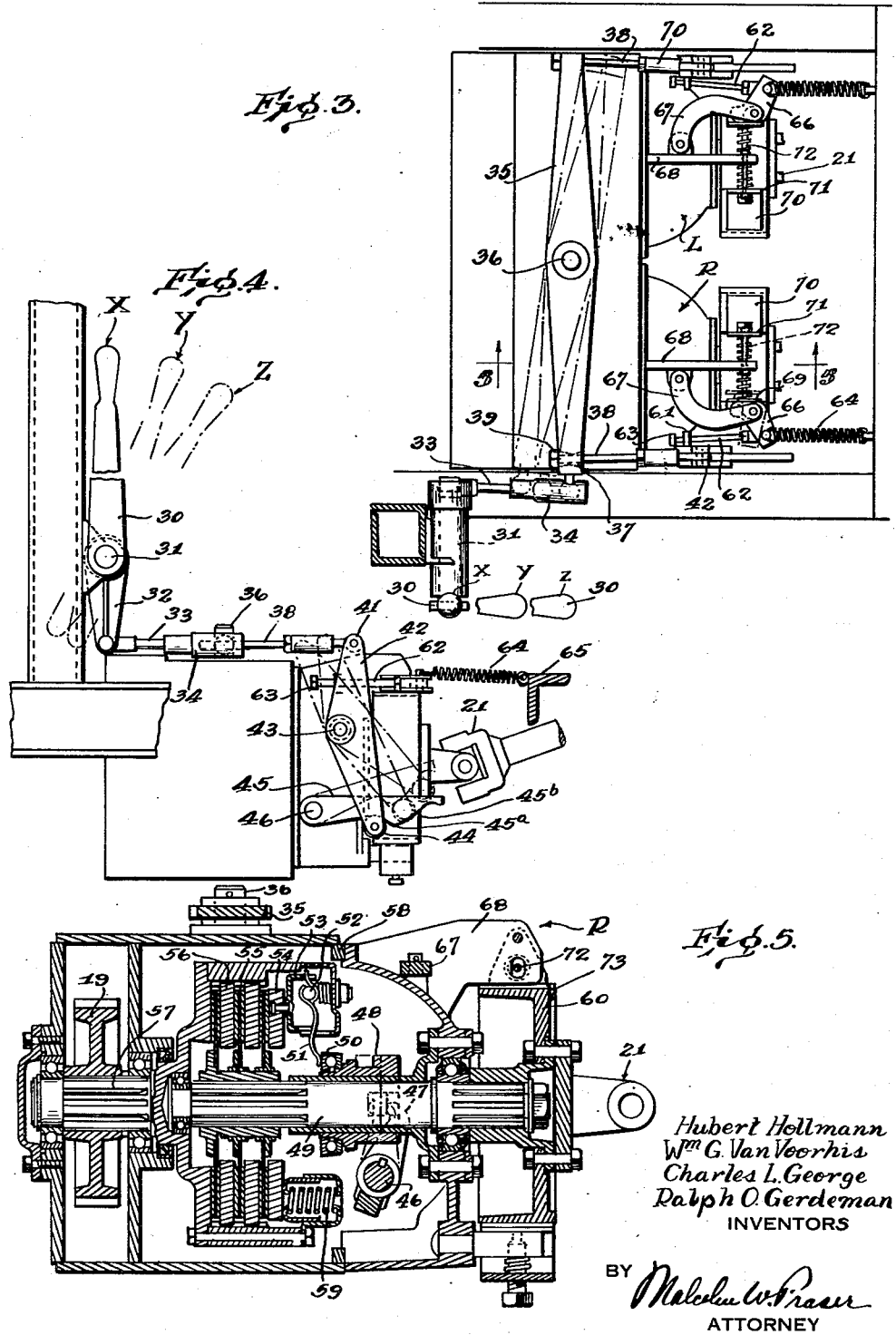

Patented Sept. 7, 1943

2,328,804

UNITED STATES PATENT OFFICE 2,328,804

TRACTOR DRIVING AND STEERING MECHANISM

Hubert Hollmann, William G. Van Voorhis, Charles L. George, and Ralph O. Gerdeman, Findlay, Ohio, assignors to The Buckeye Traction Ditcher Company, Findlay, Ohio, a corporation of Ohio Application June 21, 1941, Serial No. 399,053

8 Claims. (Cl. 180—9.2)

This invention relates to tractors but more particularly to tractors equipped with laterally spaced independently driven traction units so that one unit can be driven independently of the other unit for steering the tractor in one direction or the other, such arrangement being particularly desirable in connection with excavating machines.

An object is to produce a simple and efficient driving and steering mechanism for a tractor employing a single manual control capable of successively actuating the clutch and brake structures on one side or the other in such manner that the clutch is rendered fully ineffective before the brake is applied, no movement being imparted to the clutch during the application or release of the brake.

Another object is to simplify tractor driving and steering mechanism by employing a clutch operating arm so designed and associated with other parts that it may be actuated to such position as to render the clutch ineffective and irrespective of additional movement of associated parts in rendering the brake effective, the arm will remain in its adjusted position until the brake is rendered ineffective.

A further object is to produce a tractor driving and steering mechanism having new and improved features of construction, arrangement and operation hereinafter described.

For purposes of illustration but not of limitation, an embodiment of the invention is shown on the accompanying drawings in which Figure 1 is a diagrammatic side elevation of a boom type excavator, a portion of the boom being broken away and a portion of the frame being broken out more clearly to illustrate the driving and steering mechanism;

Figure 2 is a top plan diagrammatic view showing portions of the driving mechanism for the traction units;

Figure 3 is an enlarged top plan view of the clutch and brake mechanisms and associated parts;

Figure 4 is a side elevation of the manual control lever and associated operative connections for actuating the clutch and brake assemblies; and Figure 5 is an enlarged vertical sectional elevation substantially on the line 5—5 of Figure 3.

The illustrated embodiment of the invention comprises a boom type trenching machine which has a main frame 1 which is equipped with a pair of laterally spaced crawler or traction units 2. Only one of the traction units is indicated on the drawings but it will be manifest that similar crawler units are arranged on opposite sides of the main frame and operate to advance the machine either during digging or trenching operations or when the boom excavator is elevated to its traveling position. Mounted on the main frame 1 and arranged in advance of the front ends of the crawler units is an internal combustion engine 3 which, as will readily be apparent, operates to counterbalance the weight of the boom type excavator 4 which is carried at the opposite end of the main frame and extends beyond the rear ends of the crawler units 2.

Through suitable connections the excavator 4 which is of the usual type having an endless series of excavating buckets (not shown), is driven from the internal combustion engine through well-known constant center drive 5. The details of the construction, arrangement and drive of the excavator 4 forms no part of the present invention and more detail description and illustration is not considered necessary. It will be apparent, however, that the excavator 4 elevates the dirt from the trench and throws it against a shield 6 which deflects it to a lateral spoil conveyor 7 for discharging the spoil to one side of the machine during the advancing movement thereof. In this instance, hydraulic mechanism, generally indicated at 8, of the piston and cylinder type, is suitably connected to the excavator 4 for imparting raising and lowering movements to the excavator along a downwardly inclined track. Reference is hereby made to our co-pending application Serial No. 399,052, filed June 21, 1941, for more detailed description and illustration of the raising and lowering mechanism and associated parts.

Power is transmitted from the internal combustion engine 3 through a suitable clutch 9, transmission 10, to a transfer case 11 from which a portion of the power is delivered to the excavator drive 5 and other power through suitable gearing is transmitted through a universal joint 12, shaft 13 and a second universal joint 14 to a second transfer case 15. From the transfer case 15 through suitable connections, power is transmitted to operate the lateral conveyor 7 and through suitable gearing (not shown) power is transferred to traction transmission 16 to a universal joint assembly 17 toward the front of the machine. From the universal joint assembly 17, power is transmitted to a driving pinion 18 (Figure 2) and the pinion 18 meshes respectively with a gear 19 and through an idler 19a, drives a gear 20. As will hereinafter appear, the gear 19 is operatively associated with the right-hand clutch and brake assembly indicated at R and the gear 20 is operatively associated with the left-hand clutch and brake assembly L. The right-hand clutch and brake assembly R controls the operation of the right-hand crawler unit 2 and the left-hand clutch and brake assembly L controls the left-hand crawler unit 2, the words "right" and "left" hand indicating the right and left-hand of the operator standing on the machine and facing toward the front of the machine.

Inasmuch as the construction and operation of the clutch and brake assemblies R and L are identical, it is considered sufficient to describe in detail the assembly R. In advance of the clutch and brake assembly R and deriving its rotation therefrom is a universal joint 21 to which is connected a telescoping shaft arrangement 22 and at the forward end of the telescoping shaft 22 is a universal joint 23 which is operatively connected to drive a bevel pinion 24 disposed within a gear case 25. The bevel pinion 24 meshes with a bevel gear 26 and fixed to the same shaft carrying the bevel gear 26 and disposed on the outside of the gear case 25 is a sprocket wheel 27. From the sprocket wheel 27 leads an endless chain 28 to a sprocket wheel 29 which is connected to drive the right-hand crawler unit as will be readily understood by those skilled in this art.

For controlling the operation of the two crawler units 2, a single manual control lever 30 is provided. The lever 30 is fixed to a shaft 31 (Figures 3 and 4) and fixed to the shaft 31 and depending therefrom is an arm 32. Pivoted to the lower end of the arm 32 is a link 33 which has a ball and socket connection 34 with a transversely disposed rock arm 35. The rock arm 35 is pivoted centrally between the ends thereof to swing about a vertical pivot 36 and in each end of the rock arm 35 is a lateral hole 37. Mounted for sliding movements through each of the holes 37 at opposite ends of the rock arm 35 is a rod 38 having a head 39. The forward end of each rod 38 is pivoted at 41 to the upper end of a bifurcated upright rock arm 42. It will be apparent that the construction on opposite sides of the machine is duplicated and henceforth description will be given only of one side of the machine. The upright rock arm is pivoted intermediate its ends upon a horizontal pivot 43 and at the lower end of the arm 42 disposed between the furcations thereof is a roller 44.

Disposed between the furcations of the rock arm 42 and resting against the roller 44 is a cam lever 45 the lower surface of which is formed with a downwardly extending cam surface 45a which merges with an arcuate surface 45b taken on an arc concentric with the pivotal point 43 of the arm 42, when the cam 45 is raised to dotted position shown on Figure 4. The cam lever 45 is fixed at one end to a shaft 46 and keyed to the shaft 46 is a yoke 47 which operatively engages a collar 48 on a shaft 49. The shaft 49 is contained within the clutch and brake assembly R. Carried by the collar 48 is a thrust bearing 50 which bears against one end of a lever 51 which is suitably pivoted near its opposite end at 52. The opposite end of the lever 51 engages a bracket 53 carried by a clutch pressure plate 54. Preferably several similar levers 51 are employed about the shaft 49 but description and illustration of one of these shafts is considered sufficient. As is usual with a multiple disc clutch, a number of clutch discs or plates 55 are splined to the shaft 49 and interposed therebetween are clutch parts generally designated at 56 which are fixed for rotation to a stub shaft 57 on which the gear 19 above mentioned is splined. The above described parts are contained within a housing 58 having suitable bearings for the stub shaft 57 and the driven shaft 49. A series of coil springs 59 (only one being shown) normally urges the clutch parts into operative engagement.

From the above description it will be apparent that movement of the manual control lever 30 in one direction, i. e. forwardly from its straight up and down position, through the connections described, raises or rocks the cam lever 45 in a counterclockwise direction (Figure 4) upon engagement by the roller 44 with the hump or raised portion 45a on the cam lever. It will be understood that this cam lever 45 is the one disposed on the right-hand side of the machine. On the other hand, movement of the control lever 30 rearwardly or toward the rear end of the machine will operate the cam lever 45 on the left-hand side of the machine and at such time, the rock arm 35 will rock in a counterclockwise direction (Figure 3), whereas in actuating the cam lever 45 on the right-hand side of the machine, the rock arm 35 rocks in a clockwise direction. Thus it will be apparent from an inspection of Figure 3 that only one of the rods 38 is actuated upon rocking movement of the arm 35, the other end of the arm sliding over the rod 38 at that end. Thus the movement of the manual control lever from the position X in Figure 4 to the position Y will impart movement to the cam lever 45 on the right-hand side of the machine and by such movement, the multiple clutch disc forming a part of the clutch and brake assembly R will become disengaged so that driving of the right-hand crawler 2 is discontinued. As will hereinafter appear, continued movement of the manual control lever 30 forwardly from the position Y to the position Z operates to apply the brake to the brake forming a part of the right-hand clutch and brake assembly without in any way disturbing the associated clutch which has previously been rendered ineffective.

As shown on Figure 5, a brake drum 60 is splined to the shaft 49 and normally rotates with it.

Fixed to and projecting laterally from the rock arm 42 is an apertured lug 61 through which a rod 62 is slidable. At one end of the rod 62 and at one side of the lug 61 is a head 63 and a coil spring 64 tensions the opposite end of the rod 61. The opposite end of the spring 64 is anchored to a part 65 of the main frame. A brake actuating cam 66 has one end pivoted to an end of the rod 62 and is pivoted intermediate its ends to a curved link 67 which has its opposite end pivoted to a fin 68 on the housing 58. The free end of the actuating cam 66 engages an ear 69 on the brake band 70, the latter encircling the brake drum 60. On the opposite end of the brake band 70 is an ear 71. A rod 72 connects at one end to the pivotal connection between the link 67 and cam arm 66 and extends through openings in the ears 69 and 71 as well as through an opening in the fin 68. Interposed between the brake drum 60 and the band 70 is the usual brake lining 73.

It will be manifest that when a pull is exerted on the rod 62, to rock the cam arm 66 in a clockwise direction (Figure 3) not only is the ear 69 urged toward the ear 71, but the latter is urged toward the ear 69 through the action of the rod 72 as will be readily apparent.

It will thus be apparent that upon movement of the manual control lever 30 from the position Y to the position Z (Figure 4) roller 44 on the upright rock arm 42 rides over the arcuate surface 45b on the cam lever 45 and since that surface is now concentric with the fulcrum of the arm 42, no movement will be imparted to the cam lever 45. However, such movement of the rock arm 42 along the surface 45b will cause the apertured lug 61 to abut against the head 63 of the rod 62 and thereafter move the rod 62 to the left (Figure 3) in order to apply the brake to the drum 60. It will be apparent that a limited amount of lost motion between the apertured lug 61 and the head 63 of the rod 62 enables the rock arm 42 to impart the desired clutch releasing movement to the cam lever 45, but further movement of the rock arm 42 is effective in applying the brake as will be readily apparent.

It will be manifest from the above description that movement of the control lever 30 to the left of Figure 4 will impart corresponding successive clutch releasing and brake applying operations to clutch and brake assembly L. Thus when the control lever 30 is in its up and down position shown by full lines on Figure 4, both crawler units 2 are operatively engaged and the machine advances straight ahead. Movement of the control lever 30 forwardly from the position X to the position Y will result in releasing the multiple disc clutch and continued movement of the lever 30 forwardly to the position Z will result in the application of the brake. However, in such movement from the position Y to the position Z, the clutch remains disengaged and no further movement is applied to the clutch release mechanism. This is an important feature since in most devices of similar character, it is necessary for the clutch release parts to continue their travel before the brake is applied and this requires the use of special clutch parts. However, it will be apparent in accordance with this invention, that the usual multiple disc clutch mechanism can be employed to advantage and after the clutch is disengaged, no movement is imparted to the clutch release parts during brake applying operations.

It is to be understood that numerous changes in details of construction, arrangement and operation may be effected without departing from the spirit of the invention especially as defined in the appended claims.

What we claim is:

1. A tractor comprising a main frame, a pair of laterally spaced traction units on said frame, a power plant carried by said frame, a drive assembly individual to each traction unit, each drive assembly including a clutch and a brake, a driving connection from said power plant to both drives thereby to actuate both traction units simultaneously, a single manual control for both drive assemblies, an arm individual to each clutch and connected thereto for rendering the same ineffective, a cam surface on said arm, a curved surface on said arm contiguous to said cam surface, a lever having a portion engageable successively with said surfaces so that upon rocking of said lever, said arm is first swung by engagement of said portion with said cam surface to render said clutch ineffective and continued movement of said lever causes said portion to move along said curved surface, said curved surface being such that during the movement of said portion therealong, no further movement is imparted to said arm, and an operative connection between said manual control member and each of said levers for actuating one or the other according to the direction of movement of said control member, said connection including means effective upon said continued lever movement to render the respective brake effective.

2. A tractor comprising a main frame, a pair of laterally spaced traction units on said frame, a power plant on said frame, a drive assembly individual to each traction unit, each drive assembly including a multiple disc clutch and a brake, a driving connection from said power plant to said drives thereby to actuate both traction units simultaneously, an arm individual to each of said multiple disc clutches for moving same to effect disengagement thereof, a cam surface on said arm, a curved surface contiguous to said cam surface, a lever having a portion engageable successively with said surfaces so that upon rocking of said lever, said cam arm is first swung by engagement of said portion with said cam surface to disengage the clutch parts, the curved surface being so chosen that continued movement of said lever causes said portion to move over such curved surface without imparting further movement to said arm, an operative connection between said manual control member and each of said levers for actuating one or the other according to the direction of movement of said control member, said connection including means effective upon continued lever movement to render the respective brake effective.

3. A tractor comprising a main frame, a pair of laterally spaced traction units on said frame, a power plant carried by said frame, a drive assembly individual to each traction unit, each drive assembly including a clutch and a brake, a driving connection from said power plant to both drives thereby to actuate both traction units simultaneously, control means for said drive assemblies, an arm individual to each clutch and connected thereto for rendering the same ineffective, a cam surface on said arm, a curved surface on said arm contiguous to said cam surface, a lever having a portion engageable successively with said surfaces so that upon rocking of said lever, said arm is first swung by engagement of said portion with said cam surface to render said clutch ineffective and continued movement of said lever causes said portion to move along said curve surface, said curved surface being such that during the movement of said portion therealong, no further movement is imparted to said arm, means providing an operative connection between said control means and said levers for actuating one or the other in response to the movement of said control means, said connecting means including means effective upon said continued lever movement to render the respective brake effective.

4. A tractor comprising a main frame, a pair of laterally spaced traction units on said frame, a power plant on said frame, a drive assembly individual to each traction unit, each drive assembly comprising a clutch and a brake, a rocker arm pivotally mounted intermediate its ends, an operative connection between opposite ends of said rocker arm and the brakes respectively, whereby rocking movement of said rocker arm in one direction applies one of said brakes and in the opposite direction applies the other of said brakes, a cam arm for each clutch, an operative connection between each cam arm and the respective clutch for rendering same ineffective upon actuation of said cam arm, an actuating arm for each cam arm responsive to movement of said rocker arm, means providing a connection between the respective cam arm and actuating arm so that upon brake applying movement of said rocker arm, the respective cam arm is first cammed by said actuating arm to release said clutch, a single manual control lever, and an operative connection between said control lever and said rocker arm for rocking the latter in one direction or the other.

5. A tractor comprising laterally spaced traction units, a drive assembly for each unit, each drive assembly including a clutch and a brake, interconnected means for each drive assembly for successively rendering the respective clutch ineffective and subsequently applying the associated brake, said interconnected means including a clutch actuating arm, a cam surface on said arm, a uniformly curved surface on said arm contiguous to said cam surface, and a swinging actuating element for said arm engageable successively with said cam surface for imparting clutch actuating movement to said arm and then engageable progressively with said curved surface during brake applying operation, said curved surface being so correlated to said actuating element that said arm remains stationary during the continued movement of said element along said curved surface, and control means for said interconnected means.

6. A tractor comprising laterally spaced traction units, a drive assembly for each unit, each drive assembly including a clutch and a brake, interconnected means for each drive assembly for successively rendering the respective clutch ineffective and subsequently applying the associated brake, said interconnected means including a clutch actuating arm, a cam surface on said arm, a uniformly curved surface on said arm contiguous to said cam surface, and a swinging actuating element for said arm engageable successively with said cam surface for imparting clutch actuating movement to said arm and then engageable progressively with said curved surface during brake applying operation, said curved surface being so correlated to said actuating element that said arm remains stationary during the continued movement of said element along said curved surface, a single manual control member for both of said interconnected means, and an operative connection between said control member and said interconnected means for operating one of said interconnected means upon movement of said control member in one direction and the other of said interconnected means upon movement of said control member in the opposite direction.

7. A tractor comprising a main frame, a pair of laterally spaced traction units on said frame, a power plant on said frame, a drive assembly individual to each traction unit, each drive assembly comprising a clutch and a brake, a rocker arm pivotally mounted intermediate its ends, an operative connection between opposite ends of said rocker arm and the brakes respectively, whereby rocking movement of said rocker arm in one direction applies one of said brakes and in the opposite direction applies the other of said brakes, means operable in response to movement of said rocker arm to release one or the other of said clutches before applying the respective brake, means separate from said rocker arm and associated with said releasing means for holding same against effective movement during the subsequent brake applying operation, a single manual control lever, and an operative connection between said control lever and said rocker arm for rocking the latter in one direction or the other.

8. A tractor comprising a main frame, a pair of laterally spaced traction units on said frame, a power plant on said frame, a drive assembly individual to each traction unit, each drive assembly comprising a clutch and a brake, a rocker arm pivotally mounted intermediate its ends, an operative connection between opposite ends of said rocker arm and the brakes respectively, whereby rocking movement of said rocker arm in one direction applies one of said brakes and in the opposite direction applies the other of said brakes, means interconnected with said brake connection for releasing one or the other of said clutches prior to the application of the respective brake, said last means including a clutch releasing arm and means separate from said rocker arm to hold said arm stationary after the clutch is released and during application of the respective brake, a single manual control lever, and an operative connection between said control lever and said rocker arm for rocking the latter in one direction or the other.

HUBERT HOLLMANN.
WILLIAM G. VAN VOORHIS.
CHARLES L. GEORGE.
RALPH O. GERDEMAN.